United States Patent
Tice et al.

(10) Patent No.: US 6,739,648 B1
(45) Date of Patent: May 25, 2004

(54) FRICTION REDUCING SUNROOF MECHANISM

(75) Inventors: Bryan E. Tice, White Lake, MI (US); Troy Allan, Howell, MI (US); Daniel Cooney, Livonia, MI (US); Karim Dayoub, Royal Oak, MI (US); John E. Long, Highland, MI (US); Hyong Chol Park, Bessemer, AL (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/371,054

(22) Filed: Feb. 20, 2003

(51) Int. Cl.⁷ ................................................ B60J 7/057
(52) U.S. Cl. .................... 296/216.08; 296/223
(58) Field of Search ........................... 296/216.08, 223

(56) References Cited

U.S. PATENT DOCUMENTS

| | | | |
|---|---|---|---|
| 4,114,945 A | * | 9/1978 | Lutz |
| 5,114,208 A | * | 5/1992 | Ikeda et al. ................. 296/223 |
| 6,186,585 B1 | * | 2/2001 | Okada et al. ............... 296/223 |

FOREIGN PATENT DOCUMENTS

| | | | | |
|---|---|---|---|---|
| DE | 2234852 | * | 1/1974 | |
| DE | 2939992 | * | 4/1981 | |
| DE | 3044282 | * | 6/1981 | |
| DE | 3813049 | * | 11/1989 | |
| DE | 3920372 | * | 8/1990 | ................. 296/223 |
| FR | 2693687 | * | 1/1994 | |
| JP | 401282019 | * | 11/1989 | |
| JP | 403025026 | * | 2/1991 | ................. 296/223 |
| JP | 10-338032 | * | 6/1997 | |

OTHER PUBLICATIONS

Fisher Science Education, "Static and Dynamic Friction", www1.fishersci.com/education/resources/pytip10.jsp.*
Web Site, www.tribology-abc.com/abc/friction.htm, "Experimental Methods for Measuring Friction".*

* cited by examiner

Primary Examiner—Dennis H. Pedder
(74) Attorney, Agent, or Firm—Carlson, Gaskey & Olds

(57) ABSTRACT

A vehicle roof panel assembly comprises a vehicle roof panel and a track to receive the vehicle roof panel. The track has a track link and a track width. A guide is connected to the panel and slides on the track and has a portion that is selectively alterable between a first dimension and a second dimension less than the first dimension. A cable connected to the guide moves the vehicle panel along the track length and may actuate the guide portion between the first dimension and the second dimension. A drive unit is connected to the cable.

17 Claims, 2 Drawing Sheets

FRICTION REDUCING SUNROOF MECHANISM

BACKGROUND OF THE INVENTION

This invention relates to a guide for a sunroof assembly.

Sunroof assemblies typically comprise a sunroof panel moved over a vehicle roof between an open and closed position by cables. A drive unit, such as an electric motor, may move the cables to open and close the sunroof. The sunroof moves from its closed to open position on tracks that extend across the opening of the vehicle roof. Guides on the sunroof are attached to the cables, which draw the sunroof open and closed through these guides. These guides typically comprise slats of metal that slide on the tracks.

When the sunroof is closed, it is preferable that the guides fit tightly on the track so that the sunroof and its associated parts do not rattle. However, a close fit between the guides and the track results in a high level of friction between the guide and track when the sunroof is drawn by the cables of the system. As a consequence, high torque motors are required to drag the sunroof open and closed. High torque motors are not only more expensive and large, but they also require a significant amount of electricity from the vehicle's electrical system.

A need therefore exists for a vehicle sunroof assembly that reduces the friction between the guide and track of the assembly while still ensuring that the sunroof assembly does not rattle when closed.

SUMMARY OF THE INVENTION

The present invention comprises a sunroof assembly with guides that compress as the sunroof panel moves. By compressing, these guides move across the tracks of the sunroof assembly with significantly less friction than existing sunroof guides. Consequently, the inventive assembly permits the use of a smaller motor with the sunroof system. When the sunroof stops moving, the sunroof guides expand in size to fit closely with the track thereby ensuring a close fit between guide and track.

The inventive roof panel assembly comprises a vehicle roof panel and a track to receive the vehicle panel. The inventive assembly has a drive unit that manipulates a cable connected to the roof panel. In contrast to existing sunroof assemblies, however, the inventive sunroof system incorporates at least one guide that has a portion that changes dimension. When the sunroof is not moving, the guide fits closely to the track. When the guide moves, however, the portion changes dimension to thereby reduce the friction between the guide and the track.

The guide may comprise a flexible cross member attached to the drawing cable that reduces in size by flexing. The cable may flex the flexible cross member so that its width changes to a smaller width. A first guide member and a second guide member may be attached to the flexible cross member forming a generally H-shaped guide with curved sides. The first guide member may be in contact with a wall of the track while the second guide member may be in contact with the other wall of the track. The first guide member and the second guide member help secure the guide within the track when the sunroof is still. The guide may be squeezed into the track with the first guide member in contact with one wall and the second guide member in contact with the other wall. When the flexible cross member flexes and reduces in width, the guide moves more freely within the track as the guide members are pulled away from the track walls.

Accordingly, a sunroof may be supported on a track with a guide. A guide portion may alter in dimension when the guide moves along the track. When the guide no longer moves, the guide portion may return to its original size to thereby secure the sunroof to the track. The guide portion may flex between its reduced size and its original size.

In this way, the inventive sunroof assembly permits the use of lower torque motors without adding significant expense.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
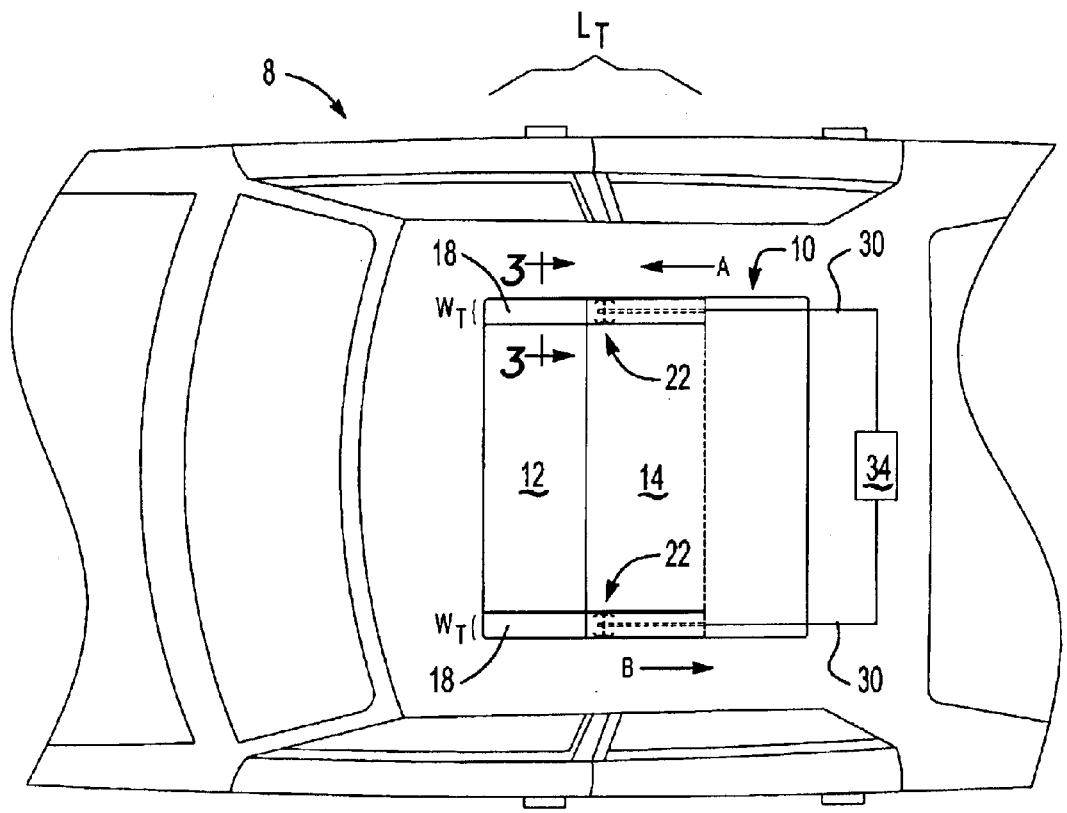
FIG. 1 illustrates an overhead view of a vehicle with a sunroof incorporating the inventive panel assembly.

FIG. 1 illustrates an overhead view of vehicle 8, which incorporates inventive vehicle panel assembly 10. Vehicle 8 has sunroof opening 12, which is shown partially covered by vehicle roof panel 14. Vehicle roof panel 14 slides along tracks 18 having width WT. Cables 30 may draw vehicle panel 14 in either the direction of arrow A or the direction of arrow B. When drive unit 34 pulls cable 30 in the direction of arrow B, cable 30 through guides 22 pulls vehicle roof panel 14 also along the direction of arrow B, thereby further opening sunroof opening 12. To close vehicle roof panel 14, cable 30, a push-pull cable, pushes guide 22 in the direction of arrow A and thereby pushes vehicle roof panel 14 in the same direction to close sunroof opening 12.

Figure 2:
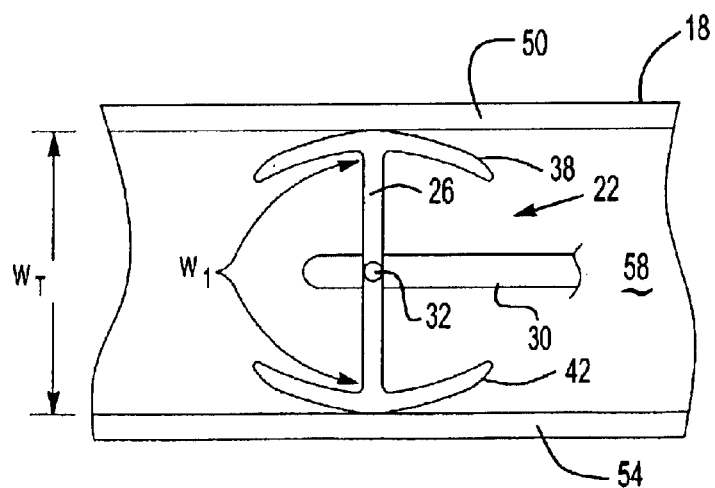
FIG. 2 illustrates the innovative guide, including flexible cross member and first guide member and second guide member in static state.
Figure 3:
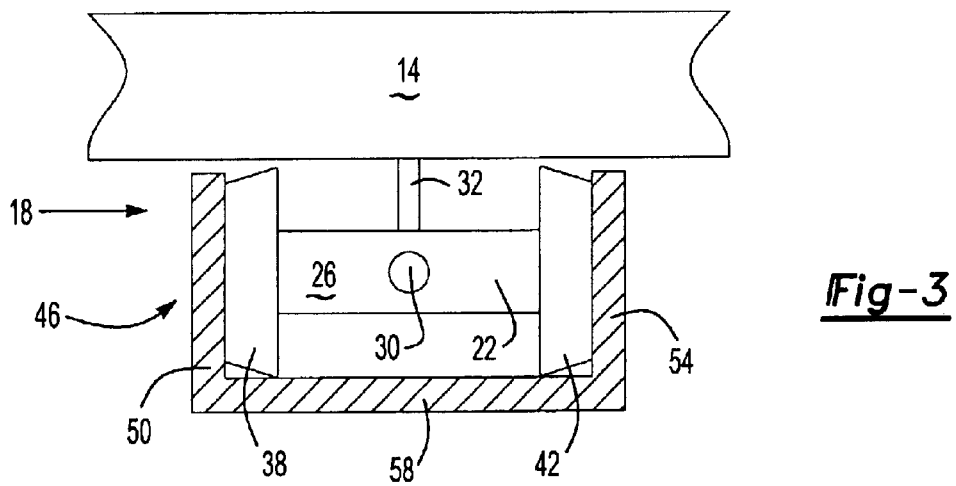
FIG. 3 illustrates an alternative view of the guide of FIG. 2, highlighting its relationship to vehicle panel.

In contrast to existing roof panel assemblies, vehicle panel assembly 10 incorporates guides 22, which compress during movement of vehicle roof panel 14. As shown in FIG. 2, guide 22 comprises guide portion 26, which intersects first guide member 38 and second guide member 42 in a perpendicular fashion to form an H-shape. First guide member 38 and second guide member 42 have a bow shape to permit guide 22 to maintain contact with first wall 50 and second wall 54 during movement as will be seen. Guide 22 is shown in its static position on floor 58 of track 18. As shown in FIG. 3, track 18 comprises a U-shaped channel having first wall 50 and second wall 54 spaced generally parallel to first wall 50 and generally perpendicular to floor 58. However, a floor can be shaped otherwise such as U or V where walls are not perpendicular to floor. As further seen in FIG. 3, vehicle roof panel 14 is connected to guide portion 26 through connector 32. In resting state, as shown in FIG. 2, guide portion 26 has width W1, which permits guide 22 to fit within width $W_t$ of track 18. Preferably, in resting position, guide 22 is slightly compressed by walls 50 and 54. That is, guide portion 26 in an unflexed position presses first guide member 38 against first wall 50 and second guide member 42 against second wall 54. This close fit permits vehicle roof panel to rest securely on tracks 18 and helps eliminate any rattle.

Figure 4:
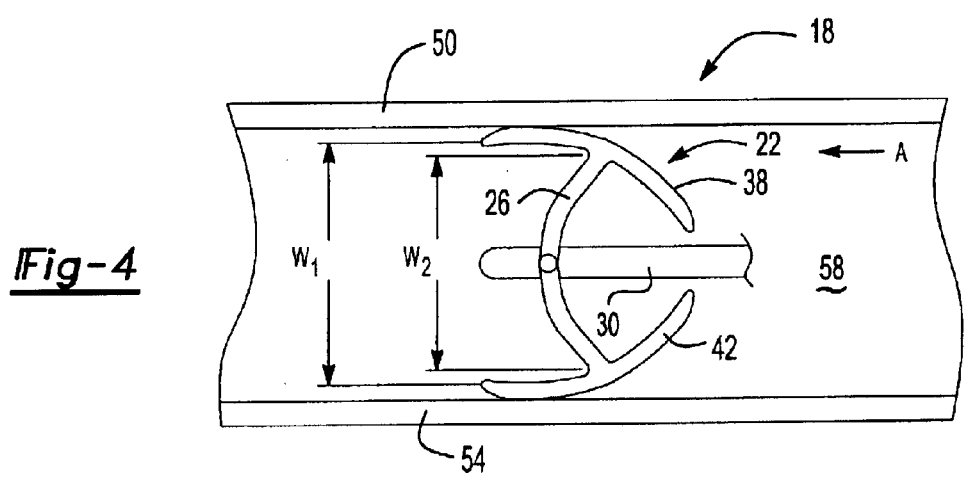
FIG. 4 illustrates guide in motion when cable is pushed.
Figure 5:
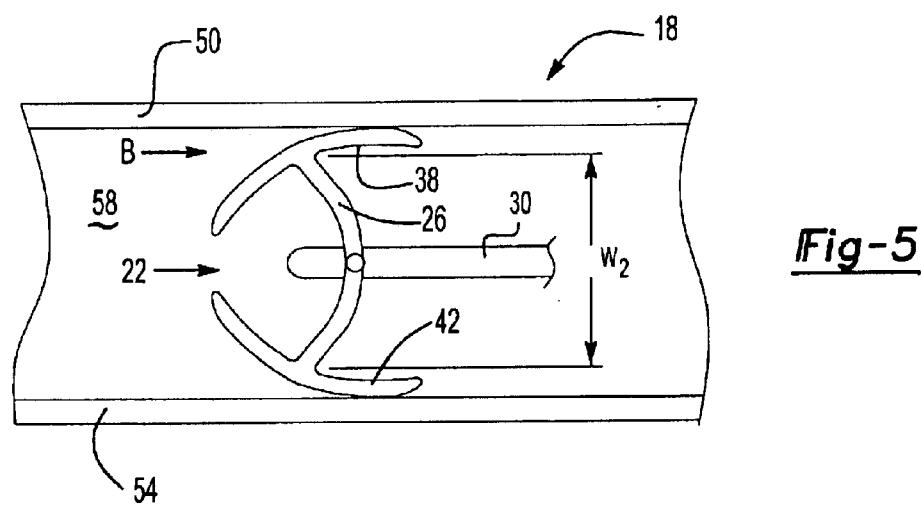
FIG. 5 illustrates guide in motion when cable is pulled.

Cable 30 is a commercially available push-pull cable. When cable 30 is pushed as when moving in the direction of arrow A (see FIG. 4) or pulled as when drawn in the direction of arrow B (see FIG. 5), guide portion 26 changes from width $W_t$ to width $W_2$ as a consequence of its flexing by cable 30. Width $W_2$ is less than width $W_t$. By altering width of guide portion 26, guide portion 26 causes first guide member 38 to reduce pressure on first wall 50 and second guide member 42 to reduce pressure on second wall 54. By reducing the force that guide members 38, 42 press against walls 50,54, guide 22 may slide more freely along the direction drawn or pushed by cable 30. In this way, friction is reduced between guide 22 and track 18, permitting vehicle roof panel 14 to slide more easily on track 18. Accordingly, guide 22 has a lower frictional resistance when moving than when static. This reduction in frictional force during movement of vehicle roof panel 14 permits the use of a smaller drive unit 34.

When cable 30 no longer pushes or pulls flexible cross member 26, flexible cross member 26 returns to its original width W1 as shown in FIG. 2 and presses first guide member 38 against first wall 50 and second guide member 42 against second wall 54, thereby holding guide 22 in place. Accordingly, when static, first guide member 38 and second guide member 42 exert a greater pressure on walls 50, 54 than if guide 22 were moving. The inventive guides 22 thus promote free movement of vehicle roof panel 14 while still securely holding vehicle roof panel 14 in place when static. The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this

What is claimed is:

1. A vehicle roof panel assembly, comprising:
   a vehicle roof panel;
   a tack to support said vehicle roof panel, having a track width;
   a guide received in said tack, said guide operatively connected to said vehicle roof panel and said guide having a guide portion selectively alterable between a first guide portion dimension and a second guide portion dimension less than said first guide portion dimension;
   a cable operatively connected to said guide for moving said vehicle roof panel along said track, said cable actuating said guide portion between said first guide portion dimension and said second guide portion dimension; and
   a drive unit operatively connected to said cable.

2. The vehicle panel guide assembly of claim 1 wherein said guide portion comprises a flexible cross member attached to said cable, said flexible cross member flexible between said first guide portion dimension and said second guide portion dimension.

3. The vehicle panel guide assembly of claim 2 wherein said cable flexes said flexible cross member between said first guide portion dimension and said second guide portion dimension.

4. The vehicle panel guide assembly of claim 3 wherein said guide includes a first guide member and a second guide member, said first guide member and said second guide member transverse to said flexible cross member.

5. The vehicle panel guide assembly of claim 4 wherein said track comprises a channel having a first wall, a floor and a second wall said first wall generally parallel to said second wall, said first guide member in contact with said first wall and said second guide member in contact with said second wall.

6. The vehicle panel guide assembly of claim 5 wherein alteration of said guide portion between said first dimension to said second dimension reduces force of said first guide member on said first wall and said second guide member on said second wall.

7. The vehicle panel guide assembly of claim 1 wherein said first dimension and said second dimension are less than said back width.

8. A vehicle panel guide assembly, comprising:
   a track to support said vehicle panel; and
   a guide received by said track, said guide operatively connected to said vehicle panel, having a first frictional resistance in a static position and a second frictional resistance in a dynamic position, said second frictional resistance lower than said first frictional resistance, the guide having a guide portion selectively actuable between a first guide portion dimension in said static position and a second guide portion dimension in said dynamic position; and
   a cable operatively connected to said guide for moving said vehicle panel along said track, wherein the cable actuates said guide to select between said first guide portion dimension and said second guide portion dimension.

9. The vehicle panel guide assembly of claim 8 wherein said guide portion comprises a flexible cross member attached to said cable, said flexible cross member flexing between said first guide portion dimension and said second guide portion dimension.

10. The vehicle panel guide assembly of claim 9 wherein said cable flexes said flexible cross member between said first guide portion dimension and said second guide portion dimension.

11. The vehicle panel guide assembly of claim 10 wherein said guide includes a first guide member and a second guide member, said first guide member and said second guide member transverse to said flexible cross member.

12. The vehicle panel guide assembly of claim 11 wherein said first guide portion are in contact with a first wall and a second wall of said track.

13. A method of moving a vehicle panel, comprising the steps of:
   (a) supporting a vehicle panel on a track with a guide;
   (b) selectively reducing a portion of the guide between a first dimension and a second dimension, the second dimension smaller than the first dimension; and
   (c) moving the guide along the track with the portion having the second dimension.

14. The method of claim 13 wherein moving the guide alters the portion of the guide between the first dimension and the second dimension.

15. The method of claim 13 including the step of returning the portion of the guide to the first dimension.

16. The method of claim 15 wherein the guide returns to the first dimension when the guide stops.

17. The method of claim 13 wherein the guide flexes between the first dimension and the second dimension.

* * * * *

UNITED STATES PATENT AND TRADEMARK OFFICE
CERTIFICATE OF CORRECTION

PATENT NO. : 6,739,648 B1
DATED : May 25, 2004
INVENTOR(S) : Tice et al.

Page 1 of 1

It is certified that error appears in the above-identified patent and that said Letters Patent is hereby corrected as shown below:

Column 3,
Lines 46 and 48, "tack" should be -- track --
Line 55, "roof" should be -- root --

Column 4,
Line 7, insert -- , -- after "second" and before "wall"
Line 18, "back" should be -- track --
Line 49, insert -- and said second guide portion -- after "portion" and before "are"

Signed and Sealed this

Nineteenth Day of April, 2005

JON W. DUDAS
*Director of the United States Patent and Trademark Office*